United States Patent [19]
Hori

[11] Patent Number: 5,155,427
[45] Date of Patent: Oct. 13, 1992

[54] DRIVE CONTROLLER FOR STEPPING MOTOR

[75] Inventor: Fusao Hori, Shizuoka, Japan

[73] Assignee: Tokyo Electric Co., Ltd., Tokyo, Japan

[21] Appl. No.: 624,150

[22] Filed: Dec. 7, 1990

[30] Foreign Application Priority Data

Dec. 12, 1989 [JP] Japan .................................. 1-321724

[51] Int. Cl.⁵ .............................................. H02P 8/00
[52] U.S. Cl. .................................................. 318/696
[58] Field of Search .................... 318/696, 685, 739

[56] References Cited

U.S. PATENT DOCUMENTS 3,112,433 11/1963 Fairbanks ............................ 318/739
4,540,927 9/1985 Tanimoto ............................ 318/696
4,703,244 10/1987 Takeuchi et al. .................... 318/696
4,746,849 5/1988 Rosshirt ............................ 318/696

FOREIGN PATENT DOCUMENTS 0273506 7/1988 European Pat. Off. .
3343688 6/1984 Fed. Rep. of Germany .

OTHER PUBLICATIONS

"Stepping Motors" Kenjo pp. 123, 124 Clarendon Press, Oxford 1984.
"Digital Fundamentals" Floyd pp. 260-264, Bell & Howell Company 1982.
2421 Radio Fernsehen Elektronik 37 (1988) No. 10, Berlin, DDR.

Primary Examiner—William M. Shoop, Jr.
Attorney, Agent, or Firm—Frishauf, Holtz, Goodman & Woodward

[57] ABSTRACT

A drive controller of the N-phase stepping motor includes a signal generator for generating M pulse signals at such an interval that the stepping motor can be driven in response to the pulse signals so as to rotate the stepping motor through an M step angle in one direction, and a driver for determining an exciting phase which is one step ahead of the current exciting phase as a next exciting phase in response to the pulse signal generated from the signal generator and exciting the stepping motor set in the thus determined exciting phase. In the drive controller, the signal generator generates pulse signals as a pulse signal group at such an interval that the stepping motor cannot respond to the pulse signals and repeatedly generates the pulse signal group by M times at such an interval that the stepping motor can be driven in response thereto so as to rotate the stepping motor in a reverse direction.

6 Claims, 4 Drawing Sheets

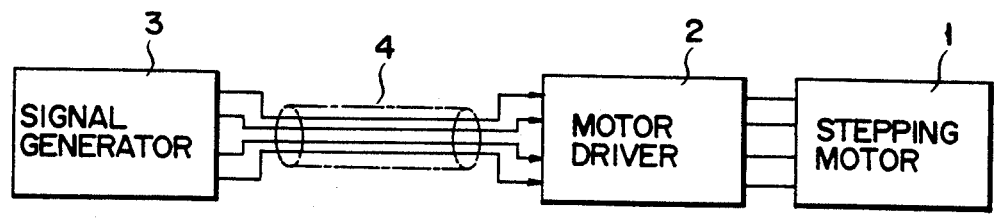
F I G. 1
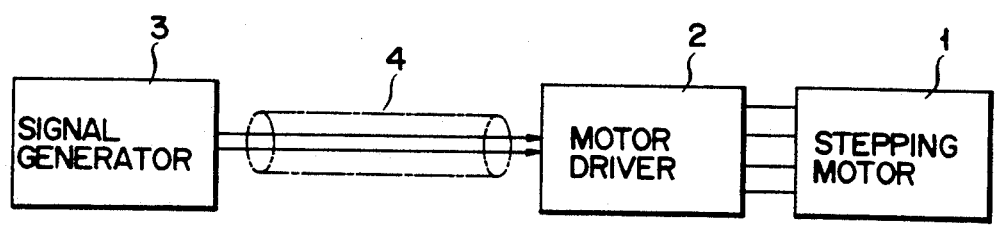
F I G. 2

DRIVE CONTROLLER FOR STEPPING MOTOR

BACKGROUND OF THE INVENTION

1. Field of the Invention

This invention generally relates to a drive controller for a stepping motor and more particularly to a drive controller for a stepping motor whose rotation direction is required to be reversed.

2. Description of the Related Art

In a general serial printer, a stepping motor is used to set the print head to a desired position. The print head is driven by rotation of the stepping motor and moves in a forward or backward direction according to the rotation direction of the stepping motor. The stepping motor has a plurality of exciting coils arranged around the rotor and is rotated by sequentially exciting the exciting coils two at one time as an exciting phase. At this time, the rotation angle of the stepping motor is determined by the exciting phase. The feature of the stepping motor is that the rotation angle can be precisely set and the speed thereof can be easily controlled, and therefore the print head can be set to the printing position with extremely small error.

Now, the drive controller of the stepping motor is explained. Generally, the drive controller includes a signal generator for generating a motor control signal to rotate the stepping motor by a preset rotation angle and a motor driver for shifting the exciting phase according to the motor control signal to supply an exciting current to two exciting coils of each exciting phase. Generally, the signal generator and motor driver are connected to each other via a cable. In a case where the stepping motor has exciting coils A, B, C and D, for example, the drive controller sequentially excites the exciting coil pairs AB, BC, CD and DA as respective exciting phases. The exciting phase is shifted in the order of the exciting coil pairs AB, BC, CD and DA when the rotation direction of the stepping motor is set in the clockwise direction and shifted in the order of the exciting coil pairs DA, CD, BC and AB when the rotation direction of the stepping motor is set in the counterclockwise direction. The stepping motor rotates by one step angle each time the exciting phase is shifted. The rotation speed of the stepping motor is determined by the interval between the exciting operations.

FIGS. 1 and 2 show an example of a conventional drive controller. In the drive controller shown in FIG. 1, a signal generator 3 generates a 4-bit motor control signal for specifying a next exciting phase at an exciting timing. The first to fourth bits of the motor control signal are respectively allotted to the exciting coils A, B, C and D and two of them are selectively set to "1" at the exciting timing. The motor driver 2 supplies an exciting current to the exciting coil pair AB, BC, CD or DA of the stepping motor 1 according to a control signal "1100", "0110", "0011" or "1001". In the drive controller shown in FIG. 2, a signal generator 3 generates a 2-bit motor control signal for specifying the rotation direction of the stepping motor 1 at an exciting timing. The first and second bits of the control signal are respectively allotted to the clockwise direction and counterclockwise direction and one of them is selectively set to "1" at the exciting timing. The motor driver 2 holds information on the current exciting phase of the stepping motor 1 and supplies an exciting current to an exciting coil pair of a next exciting phase in the clockwise direction or counterclockwise direction respectively corresponding to the control signal "10" or "01".

Recently, the demand for small and inexpensive printers has significantly increased. In this type of printer, it is preferable to set the number of bits of a motor control signal to be transmitted via a cable 4 as small as possible. For example, since the motor control signal of the drive controller shown in FIG. 2 is smaller in the number of bits than that of the drive controller shown in FIG. 1, the cable can be relatively easily laid and extended in the printer and can be connected to the signal generator 3 and motor driver 2 by use of a small connector. In the prior art, the number of bits of the motor control signal cannot be made smaller than that of the drive controller shown in FIG. 2.

SUMMARY OF THE INVENTION

An object of this invention is to provide a drive controller for a stepping motor in which the number of bits of a motor control signal can be reduced to one bit.

The above object can be attained by a drive controller for an N-phase stepping motor comprising a signal generator for generating M pulse signals at such an interval that the stepping motor can be driven in response to the pulse signals so as to rotate the stepping motor through an M step angle in one direction, generating (N-1) pulse signals as a pulse signal group at such an interval that the stepping motor cannot respond to the pulse signals and repeatedly generating the pulse signal group by M times at such an interval that the stepping motor can be driven in response thereto so as to rotate the stepping motor in a reverse direction; and a driver for determining an exciting phase which is one step ahead of the current exciting phase as a next exciting phase in response to the pulse signal generated from the signal generator and exciting the stepping motor set in the thus determined exciting phase.

With the above drive controller, the driver always specifies an exciting phase which is ahead of the current exciting phase. In a case where the stepping motor is rotated in one direction, the signal generator generates pulse signals at such a interval that the stepping motor can be driven in response to the pulse signals and the driver advances the exciting phase in response to the pulse signal supplied from the signal generator to excite the stepping motor. When the exciting phase corresponding to "the current exciting phase + 1" is excited, a period of time in which the stepping motor can be driven is set before the next excitation and the stepping motor is rotated by one step angle in one direction in this period of time. On the other hand, in a case where the stepping motor is rotated in a reverse direction, the signal generator generates (N-1) pulse signals at such an interval that the stepping motor cannot be driven in response thereto so as to cause the driver to sequentially advance the exciting phase in response to the pulse signals from the signal generator and excite the stepping motor. However, the stepping motor cannot be driven in response to the pulse signal until the (N−1)th pulse signal is generated and the exciting phase of (the current exciting phase − 1) is excited. When the exciting phase of (the current exciting phase − 1) is excited, a period of time which is sufficiently long to permit the stepping motor to be driven is set before the next excitation and the stepping motor can be rotated by one step angle in a reverse direction in this period of time.

The drive controller drives the stepping motor by determining the number and the interval of pulse signals supplied from the signal generator to the driver in the above-described manner so as to rotate the stepping motor in a desired direction. Since the pulse signal is a 1-bit signal, the cable for transmitting the signal can be easily laid and extended in the printer and can be connected to the signal generator and motor driver by use of a small connector.

BRIEF DESCRIPTION OF THE DRAWINGS

FIGS. 1 and 2 are diagrams showing the conventional cases of the drive controller of the stepping motor;

DETAILED DESCRIPTION OF THE PREFERRED EMBODIMENT

There will now be described a drive controller of a stepping motor according to one embodiment of this invention with reference to FIGS. 3 to 6.

Figure 3:
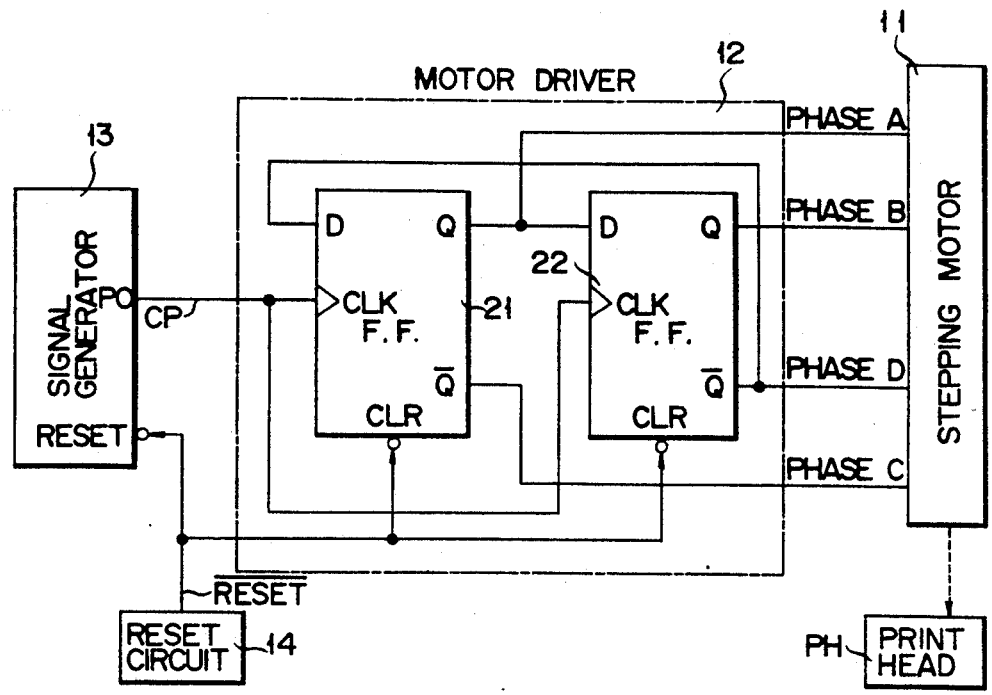
FIG. 3 is a circuit diagram of the drive controller of a stepping motor according to one embodiment of this invention.

FIG. 3 is a circuit diagram of the drive controller. The drive controller is incorporated into a serial printer which is well known in the art and is used to drive a stepping motor 11 for setting the print head PH to a desired printing position. The print head PH is driven by rotation of the stepping motor 11, and is moved in a forward direction in response to rotation of the stepping motor in the clockwise direction and in a backward direction in response to rotation of the stepping motor in the counterclockwise direction. The stepping motor 11 has N-phase exciting coils, for example, 4-phase exciting coils A, B, C and D arranged around the rotor and is rotated by sequentially exciting the exciting coils A, B, C and D two at a time, for example.

The drive controller includes a signal generator 13 for generating a motor control signal to rotate the stepping motor by a preset angle, and a motor driver 12 for shifting the exciting phase in response to the motor control signal and supplying an exciting current to two exciting coils of each phase. The signal generator 13 and the motor driver 12 are connected to each other via a cable, for example. The exciting phase is shifted in the order of the exciting coil pairs AB, BC, CD and DA when the rotation direction of the stepping motor is set in the clockwise direction and shifted in the order of the exciting coil pairs DA, CD, BC and AB when the rotation direction of the stepping motor is set in the counterclockwise direction. The stepping motor rotates by one step angle each time the exciting phase is shifted. The rotation speed of the stepping motor is determined by the interval between the exciting operations.

The signal generator 13 is constituted by a computer circuit having a CPU, ROM and RAM and cooperates with other elements to effect the printing operation of the printer. In order to effect the operation of the drive controller, the signal generator 13 generates, from an output terminal PO, M pulse signals at such an interval T1 that the stepping motor 11 can be driven in response thereto so as to rotate the stepping motor 11 in the clockwise direction by an M step angle. Further, the signal generator 13 generates, from the output terminal PO, (N−1) or 3 pulse signals as a pulse group at such an interval T2 that the stepping motor 11 cannot be driven in response thereto and repeatedly generates the pulse group by M times at such an interval T1 that the stepping motor can be driven in response thereto so as to rotate the stepping motor 11 in the counterclockwise direction by an M step angle. Each pulse signal is supplied as the motor control signal to the motor driver 12. The interval T1 which may permit the stepping motor 11 to be driven and the interval T2 which will not permit the stepping motor to be driven are inherent to the stepping motor 11 itself and are determined by the self-starting frequency which is known in the art and represents the response characteristic of the motor. The motor driver 12 holds information on the current exciting phase of the stepping motor 11, specifies an exciting phase which is advanced by one step from the current exciting phase in the clockwise direction in response to the pulse signal from the signal generator 13 and supplies an exciting current to an exciting coil pair of the thus specified exciting phase.

For example, the motor driver 12 includes two D-type flip-flops 21 and 22 constituting a Johnson counter. The clock input terminals CLK of the flip-flops 21 and 22 are connected to the output terminal PO of the signal generator 13 so as to receive one-bit motor control signal CP. The Q output terminal of the flip-flop 21 is connected to the D input terminal of the flip-flop 22 and the D input terminal of the flip-flop 21 is connected to the e,ovs/Q/ output terminal of the flip-flop 22. The exciting coils A, B, C and D of the stepping motor 11 are respectively connected to the Q output terminal of the flip-flop 21, the Q output terminal of the flip-flop 22, the e,ovs/Q/ output terminal of the flip-flop 21 and the e,ovs/Q/ output terminal of the flip-flop 22. Further, the clear terminals CLR of the flip-flops 21 and 22 are connected to a reset circuit 14 which supplies a reset signal $\overline{\text{RESET}}$ to the signal generator 13 and receives the reset signal e,ovs/RESET/ when the power source switch of the printer is turned on and the power source voltage has reached a preset voltage. In this case, assume that the current exciting phase is AB, for example. If pulse signals are sequentially supplied from the signal generator 13 to the driver 12 in this condition, the driver 12 specifies the exciting phase in the order of BC, CD and DA and excites the stepping motor 11 of the specified exciting phase.

Figure 4:
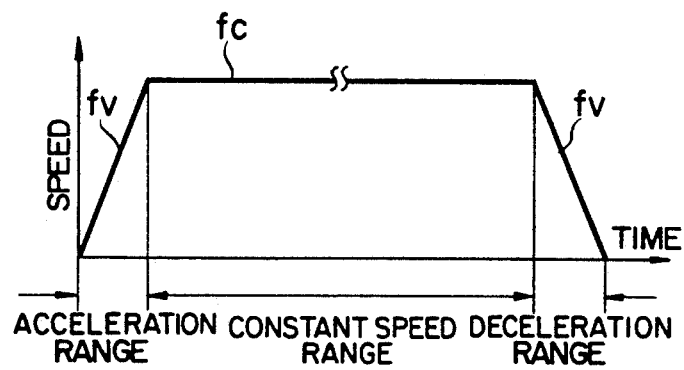
FIG. 4 is a diagram for illustration of a speed control necessary for the stepping motor used for moving a printing head of a printer and shown in FIG. 3.

The rotation speed of the stepping motor 11 must be controlled as shown in FIG. 4 to complete the movement of the print head PH in a brief period of time. That is, rotation of the stepping motor 11 is gradually accelerated in the initial stage, kept at a constant speed after it has reached the constant speed, and then gradually decelerated and stopped.

Figure 5:
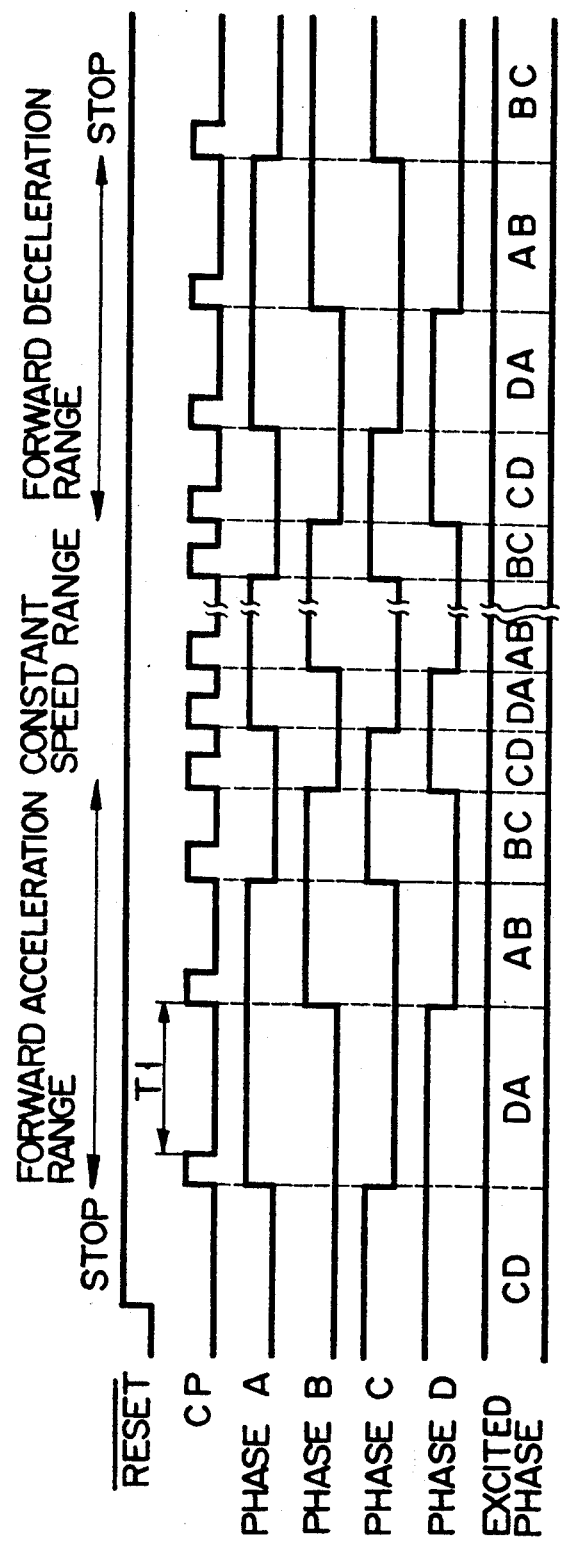
FIGS. 5 and 6 are diagrams for illustrating the operation of the drive controller shown in FIG. 3, FIG. 5 showing a case wherein the stepping motor is rotated to move the printing head in a forward direction and FIG. 6 showing a case wherein the stepping motor is rotated to move the printing head in a backward direction.

Now, the operation of the drive controller is explained with reference to FIGS. 5 and 6. FIG. 5 shows the operation of rotating the stepping motor 11 in the clockwise direction so as to move the print head PH in a forward direction and FIG. 6 shows the operation of rotating the stepping motor 11 in the counterclockwise direction so as to move the print head PH in a backward direction.

In the operation shown in FIG. 5, the signal generator 13 generates M pulse signals CP at such an interval T1 that the stepping motor 11 can be driven in response to the pulse signals so as to rotate the stepping motor 11 through an M step angle in the clockwise direction. If the stepping motor 11 is stopped in the exciting phase CD, the driver 12 sequentially specifies the exciting phases DA, AB, BC, CD, - - - in response to the pulse signals CP supplied from the signal generator 13 so as to excite the stepping motor 11. The interval T1 is set to become gradually shorter in the acceleration range, set to the minimum value in the constant speed range, and set to become gradually longer in the deceleration range in contrast to the case in the acceleration range. Since the minimum value of interval T1 permits the stepping motor 11 to be driven in response to the pulse signals, the stepping motor 11 rotates in the clockwise direction by one step angle at one time and is stopped when it has rotated by an M step angle.

Figure 6:
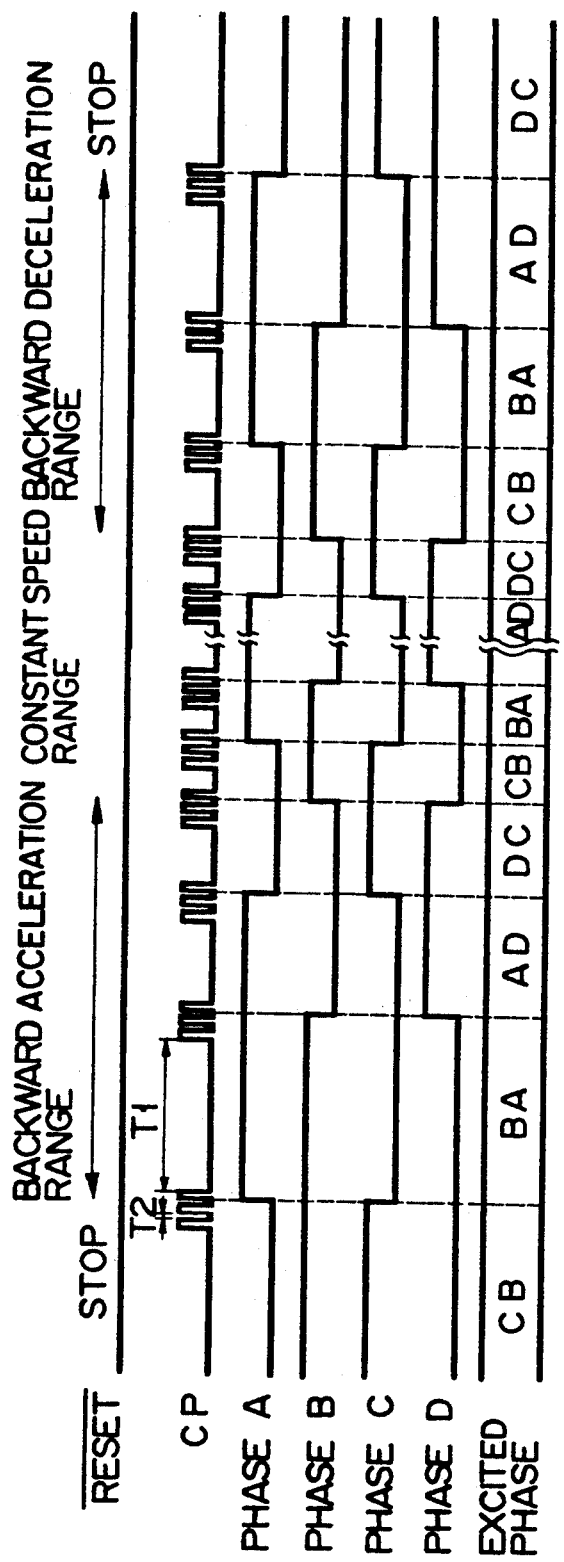

In the operation shown in FIG. 6, the signal generator 13 generates 3 pulse signals CP as a pulse signal group and repeatedly generates the pulse signal group at such an interval T1 that the stepping motor 11 can be driven in response thereto so as to rotate the stepping motor 11 in the counterclockwise direction through the M step angle. If the stepping motor 11 is stopped in the exciting phase CB, the driver 12 sequentially specifies the exciting phases CD, DA and AB in response to the three pulse signals CP supplied from the signal generator 13 and excites the stepping motor 11. At this time, the stepping motor 11 cannot be driven to the exciting phase CD or DA but can be driven to the exciting phase AB since there is a sufficiently long period of time before the next exciting operation is effected. As a result, the stepping motor 11 rotates through one step angle from the exciting phase CB to the exciting phase AB in the counterclockwise direction. Like the case of rotation in the clockwise direction, the interval, T1 is set to become gradually shorter in the acceleration range, set to the minimum value in the constant speed range, and set to become gradually longer in the deceleration range in contrast to the case in the acceleration range. Since the minimum value of interval T1 permits the stepping motor 11 to be driven in response to the pulse signals, the stepping motor 11 rotates in the counterclockwise direction by one step angle at one time and is stopped when it has rotated by an M step angle.

With the drive controller of the above embodiment, the driver 12 always specifies the exciting phase which is ahead of the current exciting phase. In a case where the stepping motor 11 is rotated in one direction, the signal generator generates pulse signals at such an interval that the stepping motor can be driven in response to the pulse signals and the driver 12 advances the exciting phase in response to the pulse signal supplied from the signal generator and excites the stepping motor 11. When the exciting phase corresponding to "the current exciting phase + 1" is excited, a period of time in which the stepping motor can be driven is set before the next excitation and the stepping motor is rotated by one step angle in one direction in this period of time. On the other hand, in a case where the stepping motor 11 is rotated in a reverse direction, the signal generator generates (N−1) pulse signals at such an interval that the stepping motor cannot be driven in response thereto so as to cause the driver to sequentially advance the exciting phase in response to the pulse signals from the signal generator and excite the stepping motor 11. However, the stepping motor 11 cannot be driven in response to the pulse signal until the (N−1)th pulse signal is generated and the exciting phase of (the current exciting phase − 1) is excited. When the exciting phase of (the current exciting phase − 1) is excited, a period of time which is sufficiently long to permit the stepping motor to be driven is set before the next excitation and the stepping motor 11 can be rotated by one step angle in the reverse direction in this period of time.

Therefore, the drive controller drives the stepping motor by determining the number and the interval of pulse signals supplied from the signal generator 13 to the driver 12 in the above-described manner so as to rotate the stepping motor 11 in a desired direction. Since the pulse signal is a 1-bit signal, the flexible cable for transmitting the signal can be easily laid and extended in the printer and can be connected to the signal generator and motor driver by use of a small connector.

What is claimed is:

1. A drive controller for an N-phase stepping motor, comprising:

signal generating means for generating a pulse sequence including M pulses to rotate the stepping motor through M step angles in one direction, and for generating a pulse sequence including M groups of (N−1) pulses to rotate the stepping motor through M step angles in a reverse direction, said M pulses being separated by a variable excitation interval set within a range in which the stepping motor is responsive, said (N−1) pulses being separated by a fixed excitation interval set within a range in which the stepping motor is not responsive, and said M pulse groups being separated by the variable excitation interval; and drive means coupled to said signal generating means for exciting the stepping motor, wherein the exciting phase of said stepping motor is advanced by one step in response to a pulse generated from said signal generating means.

2. The drive controller of claim 1, wherein said signal generating means has a single output terminal for the pulse sequence generated to rotate said stepping motor in either said one or said reverse direction.

3. The drive controller of claim 2, wherein said driver means includes counter means for specifying two phases of said N-phase stepping motor, in response to the pulse supplied from the single output terminal of said signal generating means.

4. The drive controller of claim 3, wherein:

said stepping motor includes first, second, third and fourth exciting coils:

said counter means includes first and second D-type flip-flops each having a D input terminal, a clock terminal, a Q output terminal and a $\bar{Q}$ output terminal;

each clock terminal of the first and second flip-flops is coupled to the single output terminal of said signal generating means;

the D input terminal of said first flip-flop is connected to the $\bar{Q}$ output terminal of said second flip-flop;

the D input terminal of said second flip flow is connected to the Q output terminal of said first flip-flop; and the Q output terminal of said first flip-flop, the Q output terminal of said second flip-flop, and the e,ovs/Q/ output terminal of said first flip-flop, and the e,ovs/Q/ output terminal of said second flip-flop are connected respectively to the first, second, third and fourth exciting coils of said stepping motor.

5. The drive controller of claim 1, wherein said signal generating means includes changing means for changing the variable excitation interval to accelerate and decelerate a rotation speed of said stepping motor.

6. The drive controller of claim 5, wherein said changing means includes means for decreasing the variable excitation interval during a first preset period, for maintaining the variable excitation interval during a second preset period subsequent to the first preset period, and for increasing the variable excitation interval during the third preset period subsequent to the second preset period.

* * * * *